Feb. 10, 1931.  C. A. VAN DUSEN  1,791,856
STRUCTURAL MATERIAL
Filed May 11, 1926

INVENTOR
Charles A. Van Dusen,
BY
ATTORNEY.

Patented Feb. 10, 1931

1,791,856

UNITED STATES PATENT OFFICE

CHARLES A. VAN DUSEN, OF CLEVELAND, OHIO, ASSIGNOR TO THE GLENN L. MARTIN COMPANY, OF CLEVELAND, OHIO, A CORPORATION OF OHIO

STRUCTURAL MATERIAL

Application filed May 11, 1926. Serial No. 108,279.

My invention relates to improvements in cellular rubber provided with suitable reinforcement, and has for its object the provision of a fabricating material of relatively low density and of sufficient strength and resistivity to be advantageously employed structurally in lieu of wood or other materials.

One of the prime uses for which this novel material is particularly adapted is found in aeronautical structures, wherein the requirements are the most rigid and exacting along the lines above indicated and, in addition, the qualities of being non-warpable and impervious to water are of extreme importance and inherently present in my improved structural material.

Ordinary vulcanized rubber is not adapted for the practical requirements of aeronautical structures because of its liability to fracture, its relatively high density and high cost, although the material itself possesses marked inhert advantageous qualities. Accordingly, I have not only supplied the rubber or rubber compound with suitable reinforcement, as hereinafter explained, but I have provided a cellular fabricated product possessing minimum density and maximum strength, by vulcanizing cellular hard rubber intimately associated with suitable reinforcing members or material.

Figure 1:
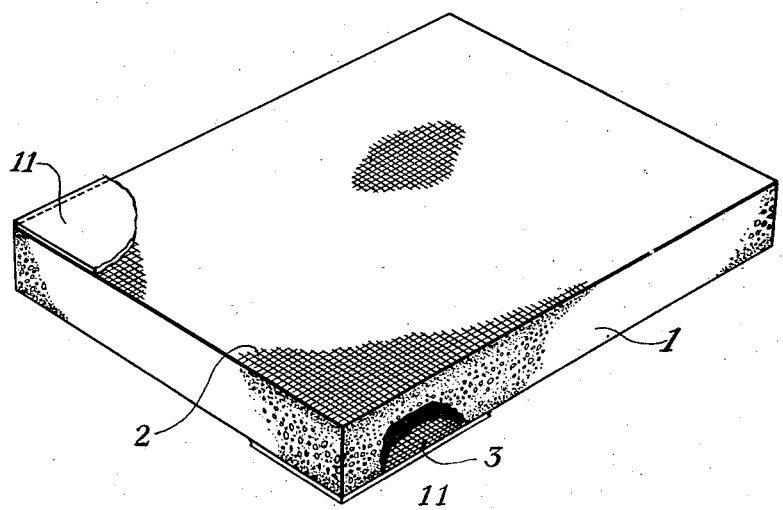

The features of my instant improvement may best be explained in connection with the accompanying drawings, wherein:

Figure 1 is a perspective view, somewhat diagrammatic in character and slightly broken away, illustrating a rectangular section of my improved cellular reinforced rubber;

Figs. 2, 3, 4, and 5 are similar figures, upon reduced scales, illustrating variously modified reinforced structural materials embodying my invention.

Throughout the several figures of the drawings I have employed the same character of reference to indicate similar parts.

In the manufacture of cellular reinforced rubber, meaning thereby the product of my instant improvement formed from suitable rubber compounds, the rubber body portion is fabricated of cellular hard rubber, wherein the cellular structure is limited to a moderate expansion during the heating and hard vulcanizing processes, whereby the cells are kept of minute size insuring strength and low density for such purposes. However, the strength of vulcanized cellular hard rubber, per se, is insufficient and the material itself is readily fractured.

Accordingly, the vulcanized cellular hard rubber has intimately associated therewith, one form or another of suitable reinforcement, such as fabric of silk, cotton or linen, wire mesh, small metallic rods or perforated metallic plates, for example, as will be explained more particularly in describing the illustrated structures and forms.

Figure 2:
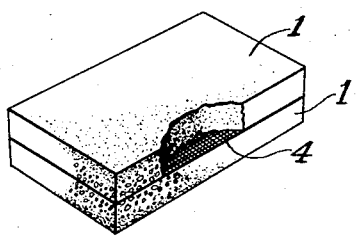

Fig. 1 discloses a sheet of cellular hard rubber 1 with which there are intimately associated fabric coverings 2, 3, upon both sides of the cellular hard rubber body, as somewhat diagrammatically shown in the drawing, while an interiorly positioned fabric 4 is intermediately vulcanized in the cellular rubber body 1, 1, of Fig. 2.

Figure 3:
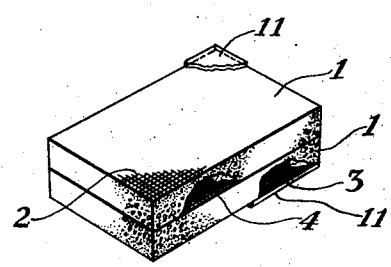

A fine wire net or mesh of bronze or steel, may be substituted for the fabric of these figures and three separate layers of fabric or mesh may be employed, combining the features of Figs. 1 and 2, as shown in Fig. 3.

Figure 4:
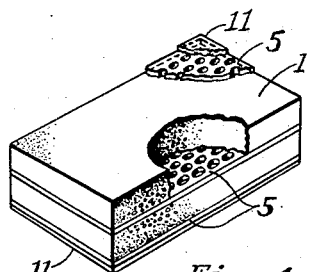

Another modification is disclosed in Fig. 4, wherein the perforated sheets 5, 5, 5, are disposed in analogous relation to the reinforcement shown in Fig. 3, in lieu of the mesh therein employed.

Figure 5:
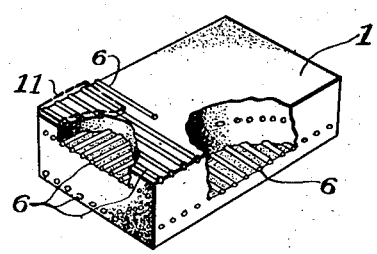

The reinforcement may also take the form of overlying, angularly positioned cords or wires 6, 6, 6, which are well shown by the broken away portions of the cellular hard rubber body 1 disclosed in Fig. 5.

These modifications typically disclose some of the forms or embodiments of which my invention is capable.

Certain conditions require that an overlying strata or outer coatings 11 of vulcanized rubber be provided as a protection to the fabric or other form of reinforcement employed, while affording a smooth, impervious surface for the fabricated material.

A study of the several figures of the drawings, coupled with an understanding of the readily variable cellular material obtainable by permitting variable expansion of the rubber body during the heating and vulcanization processes, will enable one skilled in the art to produce an extremely wide range of structural members having the advantageous characteristics of low density coupled with the toughness and strength necessary to meet the exacting requirements of aeronautical construction.

It is known in the art that various rubber compounds chemically treated and heated afford a range of "blow" or expansion in the production of cellular hard rubber varying from 40% to 400%. Thus corresponding variations in the density and strength of the hard vulcanized products are readily obtainable to correspond with requirements. For example, a cellular hard rubber sheet expanded approximately 140% during the heating and vulcanization processes has been found admirably adapted for the fabrication of hydroplane float skins; the preferred reinforcement being grade A airplane cotton for the decks and U. S. Army specification cotton duck for the bottoms, exteriorly covered with vulcanized hard rubber. It is apparent, however, that different structural requirements involve the widest variation in the characteristics of the cellular reinforced rubber employed. The reinforcement advantageously is applied in the form of cords, fabric, or other mesh, frictioned with hard rubber compound. Such reinforcement may be protectively covered either by a cemented or vulcanized exterior stratum of hard or soft rubber, although this is not necessarily required for every purpose. The problem satisfactorily solved by the instant improvement requires the provision of a light reinforced waterproof material inherently possessing high strength and highly resistant to corrosive or destroying tendencies, particularly as to its reinforcement, so that structures fabricated therefrom are capable of severe and protracted service.

Having now described the preferred mode and means for practicing my instant improvements, I claim as new and desire to secure by Letters Patent, together with such modifications thereof as may be made by those ordinarily skilled in the art, the following:

1. As an article of manufacture, a laminated fabric board comprising an outer layer of woven fibrous material bound and trussed together in parallel relation with a layer of cellular hard-rubber.

2. As an article of manufacture, a laminated fabric board comprising two plies of woven fibrous material bound and trussed together in parallel spaced relation by an interposed layer of cellular hard-rubber, the woven material being integrally coalesced to the hard-rubber by vulcanization.

3. As an article of manufacture, a laminated fabric board comprising two plies of woven fibrous material coated with a rubber composition to render them non-absorbent, said plies being bound and trussed together in a parallel spaced relation by an interposed layer of cellular hard-rubber.

In testimony whereof I do now affix my signature.

CHARLES A. VAN DUSEN.